United States Patent
Gross et al.

(10) Patent No.: US 8,365,003 B2
(45) Date of Patent: Jan. 29, 2013

(54) SYNCHRONIZING TIME DOMAIN SIGNALS IN COMPUTING SYSTEM USING PHASE FREQUENCY SLOPE VALUE OF CROSS POWER SPECTRAL DENSITY

(75) Inventors: Kenny C. Gross, San Diego, CA (US); Kalyanaraman Vaidyanathan, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 753 days.

(21) Appl. No.: 12/340,239

(22) Filed: Dec. 19, 2008

(65) Prior Publication Data
US 2010/0162026 A1    Jun. 24, 2010

(51) Int. Cl.
*G06F 13/42* (2006.01)
(52) U.S. Cl. .................................. 713/400; 713/401
(58) Field of Classification Search .................. None
See application file for complete search history.

(56) References Cited

U.S. PATENT DOCUMENTS

| 4,169,245 | A * | 9/1979 | Crom et al. | 455/132 |
| 6,940,933 | B1 * | 9/2005 | Heinonen et al. | 375/354 |
| 2010/0073044 | A1 * | 3/2010 | Cornelius | 327/145 |

* cited by examiner

*Primary Examiner* — Kenneth Kim
(74) *Attorney, Agent, or Firm* — Park, Vaughan, Fleming & Dowler LLP

(57) ABSTRACT

Some embodiments of the present invention provide a system that accurately synchronizes signals related to the operation of a computer system. During operation, the system receives a first time-domain signal associated with a first system variable and a second time-domain signal associated with a second system variable from the computer system. The system then transforms the first and the second time-domain signals into a first frequency-domain signal and a second frequency-domain signal, respectively. Next, the system computes a cross-power-spectral-density (CPSD) between the first and second frequency-domain signals to obtain a phase angle versus frequency graph between the two frequency-domain signals. The system subsequently extracts the slope of the phase angle versus frequency graph, and uses the value of the slope to synchronize the first time-domain signal and the second time-domain signal.

20 Claims, 4 Drawing Sheets

SYNCHRONIZING TIME DOMAIN SIGNALS IN COMPUTING SYSTEM USING PHASE FREQUENCY SLOPE VALUE OF CROSS POWER SPECTRAL DENSITY

BACKGROUND

1. Field

The present invention relates to techniques for enhancing the reliability of computer systems. More specifically, the present invention relates to a method and an apparatus for accurately synchronizing signals related to the operation of a computer system.

2. Related Art

Computer manufacturers often desire to characterize the operation of computer systems by measuring the relationship between various operational and performance parameters, including power usage, operating temperature, and CPU utilization. For example, it is often desirable to produce power-versus-utilization graphs for computer servers.

Typically, the variables of interest, such as power, CPU utilization, and throughput, are collected using data acquisition devices that can have different sampling rates, and different clocks which are not synchronized. For example, CPU power is often measured with an external hardware power meter coupled to the system of interest. Separately, the CPU utilization data can be obtained from the operating system, and the physical sensor data (such as CPU temperature) is collected by another external data acquisition (DAQ) unit.

Typically, the external power meter, the operating system, and the external DAQ unit operate using different clocks which are not synchronized. Some of these clocks can "speed up" or "slow down" as workload varies on the processor, thereby making synchronization of the different clocks extremely difficult. Furthermore, the sampling rates of these devices may not be the same; for example, power may be measured every minute while CPU utilization may be measured every 10 seconds.

Consequently, the time-domain signals of the system variables gathered by these data acquisition devices may exhibit lead or lag phase discrepancies between gathered signals. This lack of phase coherence between gathered signals makes it difficult to accurately analyze relationships between these signals, for example, to generate an accurate power-versus-utilization graph for a computer system.

Hence, what is needed is a method and apparatus for accurately synchronizing time-domain signals related to the operation of a computer system without the above-described problems.

SUMMARY

Some embodiments of the present invention provide a system that accurately synchronizes signals related to the operation of a computer system. During operation, the system receives a first time-domain signal associated with a first system variable and a second time-domain signal associated with a second system variable from the computer system. The system then transforms the first and the second time-domain signals into a first frequency-domain signal and a second frequency-domain signal, respectively. Next, the system computes a cross-power-spectral-density (CPSD) between the first and second frequency-domain signals to obtain a phase angle versus frequency graph between the two frequency-domain signals. The system subsequently extracts the slope of the phase angle versus frequency graph, and uses the value of the slope to synchronize the first time-domain signal and the second time-domain signal.

In some embodiments, the value of the slope of the phase versus frequency graph is proportional to the phase difference between the first and the second time-domain signals, and the sign of the slope determines a lead or lag relationship between the first and the second time-domain signals.

In some embodiments, the first time-domain signal is generated from a first sampled signal and the second time-domain signal is generated from a second sampled signal, wherein a sampling rate of the first sampled signal is different from a sampling rate of the second sampled signal.

In some embodiments, prior to transforming the first and the second time-domain signals, the system re-samples each of the time-domain signals so that a sampling rate of the first time-domain signal is substantially equal to a sampling rate of the second time-domain signal.

In some embodiments, the first time-domain signal is measured by a first measurement system having a first clock, and the second time-domain signal is measured by a second measurement system having a second clock.

In some embodiments, the system synchronizes the two time-domain signals by iteratively adjusting a phase difference between the two time-domain signals until the slope of the phase angle versus frequency graph is substantially equal to zero.

In some embodiments, the first system variable includes one of: a physical sensor variable and a software performance variable, and the second system variable includes one of: a physical sensor variable and a software performance variable.

In some embodiments, the physical sensor variable includes one of: a CPU power, and a CPU temperature, and the software performance variable includes one of: a utilization metric of the CPU, and a throughput of the computer system.

In some embodiments, the first and the second time-domain signals are used to generate an accurate power-versus-utilization graph of the computer system.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present description. Thus, the present description is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Signal Synchronization System

Figure 1:
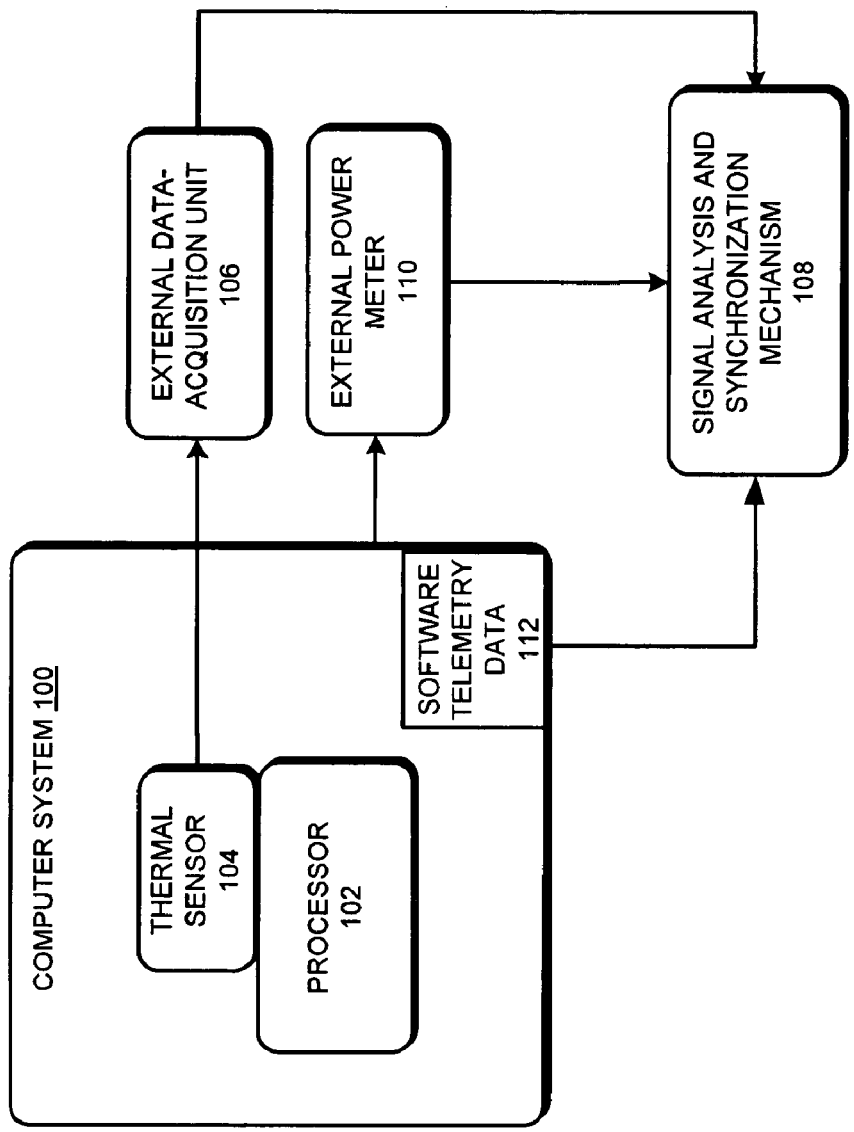
FIG. 1 presents a system that synchronizes signals related to the operation of a computer system in accordance with some embodiments of the present invention.

FIG. 1 illustrates a system that synchronizes signals related to the operation of a computer system 100 in accordance with some embodiments of the present invention. Computer system 100 includes a processor 102 and a thermal sensor 104. Thermal sensor 104 detects the temperature of processor 102, and can include, but is not limited to, any type of sensor that can measure a thermal state of processor 102 now known or later developed. In some embodiments thermal sensor 104 is integrated into processor 102.

Processor 102 can generally include any type of processor, including, but not limited to, a microprocessor, a mainframe computer, a digital signal processor, a personal organizer, a device controller, a computational engine within an appliance, and any other processor now known or later developed. Furthermore, processor 102 can include one or more cores.

Note that although FIG. 1 illustrates computer system 100 with one processor, computer system 100 can include more than one processor. In a multi-processor configuration, the processors can be located on a single system board, or multiple system boards. Computer system 100 can include, but is not limited to, a server, a server blade, a datacenter server, a field-replaceable unit, or an enterprise computer system.

Note that although the present invention is described in the context of computer system 100 as illustrated in FIG. 1, the present invention can generally operate on any type of computer system. Hence, the present invention is not limited to the specific implementation of computer system 100 as illustrated in FIG. 1.

Thermal sensor 104 is coupled to an external data-acquisition (DAQ) unit 106. External DAQ unit 106 receives a physical signal from thermal sensor 104 and this physical signal is related to the temperature of processor 102. External DAQ unit 106 then samples the received signal based on an internal clock to generate a sampled signal, and then sends the sampled signal related to the temperature of processor 102 to a signal-analysis-and-synchronization mechanism 108. Note that external DAQ unit 106 can be any device that can receive a signal from a thermal sensor 104, and can sample the received signal to generate a corresponding time-series signal.

Although FIG. 1 illustrates the process of gathering thermal sensor data from computer system 100, other types of physical sensor data can be gathered from computer system 100. In one embodiment of the present invention, instead of generating the sampled signal using an external hardware monitor, physical sensor signal can be generated inside computer system 100 with the help of a service processor.

External power meter 110 is coupled to computer system 100. External power meter 110 measures a signal related to the power usage of computer system 100. In one embodiment, external power meter 110 measures the CPU power of computer system 100. Note that the CPU power data can be represented in watts or in term of "percentage of maximum CPU power." Power meter 110 also generates a sampled time-series signal based on its internal clock, and sends the sampled time-series signal to signal-analysis-and-synchronization mechanism 108.

Computer system 100 also gathers software telemetry data 112 related to one or more software performance parameters of computer system 100. For example, software telemetry data 112 can include CPU utilization data (in percentage from 0 to 100%), and CPU throughput data, among others. Note that software telemetry data 112 is generated within computer system 100; for example, the CPU utilization data can be generated by the operating system. Hence, software telemetry data 112 can include time-series signals generated based on a clock of computer system 100. Software telemetry data 112 is also sent to signal-analysis-and-synchronization mechanism 108.

Signal-analysis-and-synchronization mechanism 108 can include any mechanism that can receive software telemetry data 112 and signals from external DAQ unit 106 and power meter 110. Signal-analysis-and-synchronization mechanism 108 also includes software tools for performing time-domain and frequency-domain analysis of the received signals. In one embodiment, signal-analysis-and-synchronization mechanism 108 includes a mechanism for generating a phase-angle versus frequency graph for a pair of frequency-domain signals. Furthermore, signal-analysis-and-synchronization mechanism 108 can include a mechanism that can synchronize two time-domain signals which are not phase-aligned.

Signal-analysis-and-synchronization mechanism 108 can be implemented in any combination of hardware and software. In some embodiments, signal-analysis-and-synchronization mechanism 108 operates on processor 102. In other embodiments, signal-analysis-and-synchronization mechanism 108 operates on one or more service processors, wherein service processors are special processors within computer system 100 that perform monitoring and management functions for other processors or components in computer system 100. In yet other embodiments, signal-analysis-and-synchronization mechanism 108 is located inside of computer system 100. In yet other embodiments, signal-analysis-and-synchronization mechanism 108 operates on a separate computer system.

In some embodiments, signal-analysis-and-synchronization mechanism 108 includes a method or apparatus for monitoring and recording computer system performance parameters as set forth in U.S. Pat. No. 7,020,802 which is hereby fully incorporated by reference. In other embodiments, signal-analysis-and-synchronization mechanism 108 receives input from a system or device that includes a method or apparatus for monitoring and recording computer system performance parameters as set forth in U.S. Pat. No. 7,020,802.

During operation, thermal sensor 104 sends a signal related to the thermal state of processor 102 to external DAQ unit 106. The signal can include, but is not limited to, the temperature of processor 102. Next, external DAQ unit 106 digitizes the signal, generates a time-series signal based on an internal clock of external DAQ unit 106, and sends the time-series signal to signal-analysis-and-synchronization mechanism 108. Concurrently, external power meter 110 measures the power used by computer system 100, such as the CPU power, digitizes the measured signal, generates a time-series signal based on an internal clock of external power meter 110, and sends the time-series signal to signal-analysis-and-synchronization mechanism 108. Also concurrently, software telemetry data 112 is generated by computer system 100 wherein the data is sampled based on a clock internal to computer system 100. This software telemetry data 112, such as a CPU utilization data, is then sent to signal-analysis-and-synchronization mechanism 108.

Signal-analysis-and-synchronization mechanism 108 concurrently receives multiple time-series signals from external DAQ unit 106, external power meter 110 and computer system 100. Note that each of these received signals can have a different sampling rate as determined by the device generating the signal. Also, the timing of these signals may be out of synchrony if the internal clocks of external DAQ unit 106, external power meter 110, and computer system 100 are not synchronized.

More details of the operation of signal-analysis-and-synchronization mechanism 108 and a technique for synchronizing received signals are described below in conjunction with FIG. 2.

Process for Synchronizing Time-Domain Signals

Figure 2:
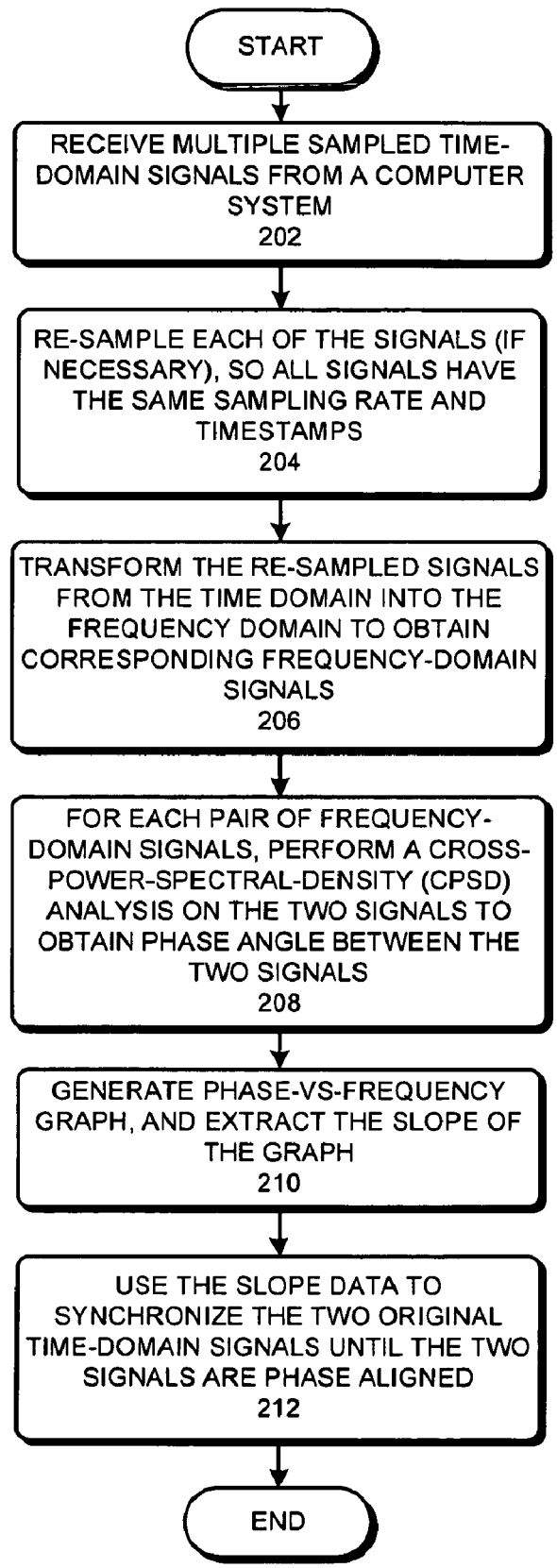
FIG. 2 presents a flowchart illustrating a process for synchronizing signals related to the operation of a computer system in accordance with some embodiments of the present invention.

FIG. 2 presents a flowchart illustrating a process for synchronizing signals related to the operation of a computer system in accordance with some embodiments of the present invention.

During operation, the system receives multiple sampled signals, such as power, CPU utilization, performance (e.g., CPU throughput), and temperature, from a computer system (step 202).

The system then analytically re-samples each of the signals (if necessary), so that all signals have the same sampling rate and timestamps (step 204). Note that although the received signals can have different sampling rates, the re-sampling operation analytically up-samples/down-samples each signal as necessary to produce a common sampling rate. This common sampling rate can be predetermined and each signal is re-sampled at this common sampling rate so that they have common time stamps. In one embodiment, this re-sampling operation involves using an interpolation technique wherein the input sampling rate of a signal can be up-sampled or down-sampled, as appropriate, using any suitable technique, including, but not limited to, linear interpolation or higher-order interpolation.

The system next transforms the re-sampled signals from the time domain into the frequency domain, for example, using a Fourier transform, to obtain corresponding frequency-domain signals (step 206).

Next, for a possible pairwise combination of the frequency-domain signals, the system performs a cross-power-spectral-density (CPSD) analysis on the two signals, which outputs the phase angle between the two signals (step 208). Specifically, this CPSD analysis involves taking the Fourier transform of the cross-correlation function between the two signals.

The system then generates a phase angle versus frequency ("phase-vs-frequency" hereafter) graph, and subsequently extracts the slope of the phase-vs-frequency graph (step 210). Note that the slope of the phase-vs-frequency graph indicates whether the corresponding time domain signals are phase aligned or not, wherein a non-zero slope indicates that the two signals are not phase aligned (i.e., a presence of a time lag), whereas a zero slope indicates that the two signals are phase aligned. Moreover, the magnitude of the slope determines the amount of phase shift, and hence the lag time, between the corresponding time-domain signals. Additionally, the sign of the slope determines a lead or lag relationship between the two signals. For example, a negative slope determines that a first signal leads a second signal and a positive slope determines that the first signal lags the second signal.

Next, the system uses the slope data to synchronize the two original time-domain signals until the two signals are phase aligned (step 212). In one embodiment, the system shifts one of the two signals by the time lag deduced from the slope, so that with this newly shifted signal, the phase-vs-frequency graph has a zero slope.

More specifically, the system uses the value of the slope to adjust the phase angle obtained from the CPSD analysis in an iterative manner. After each phase-angle-adjustment step 212, the system performs a new CPSD analysis to obtain an updated slope of the phase-vs-frequency graph, and uses the updated slope to adjust the phase angle. This iterative process repeats until a zero slope is reached, which indicates that the two original signals are substantially phase aligned.

After the time domain signals have been synchronized, the data in each signal can be used to generate graphs, charts, or any other output synchronously relating the data in one signal to one or more of the other signals. In one embodiment, the aligned CPU-power-signal and CPU-utilization-signal are used to generate a power-versus-utilization graph of the computer system. This facilitates an extremely accurate analysis during a power efficiency assessment for the computer system being monitored.

In some embodiments, the system performs the above-described CPSD analysis and synchronization for every possible pair-wise combination of the received telemetry signals. These embodiments do not consume excessive computational resources because there are typically only a small number of such signals from the computer system. In some other embodiments, the system performs the CPSD analysis and synchronization only for a subset of the received telemetry signals. In these embodiments, the system does not have to re-sample signals which do not have to be synchronized with other signals.

In some embodiments, the system re-samples signals to be synchronized to a common sampling rate. Hence, a pair of signals which are not to be synchronized do not have to be re-sampled to the same common sampling rate. Consequently, more than one common sampling rate can be used, wherein each sampling rate is used to re-sample a unique subset of signals which are to be synchronized.

Note that re-sampling step 204 may be skipped if all the received telemetry signals have the same sampling rate. However, even when step 204 is skipped for signals having the same sampling rate, the CPSD analysis and synchronization steps are still used to synchronize these signals.

Examples

Figure 3A:
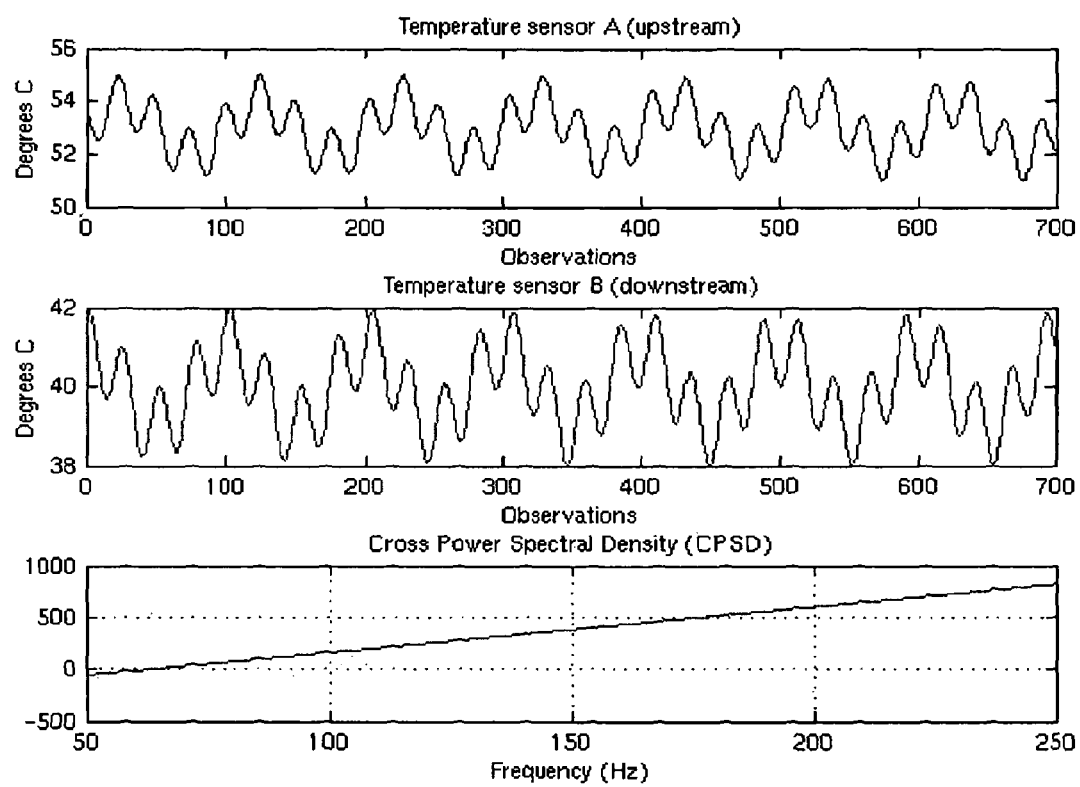
FIG. 3A illustrates two temperature sensor signals (sensor A and sensor B) and the corresponding cross-power-spectral-density (CPSD) plot of phase-vs-frequency having a non-zero slope in accordance with an embodiment of the present invention.
Figure 3B:
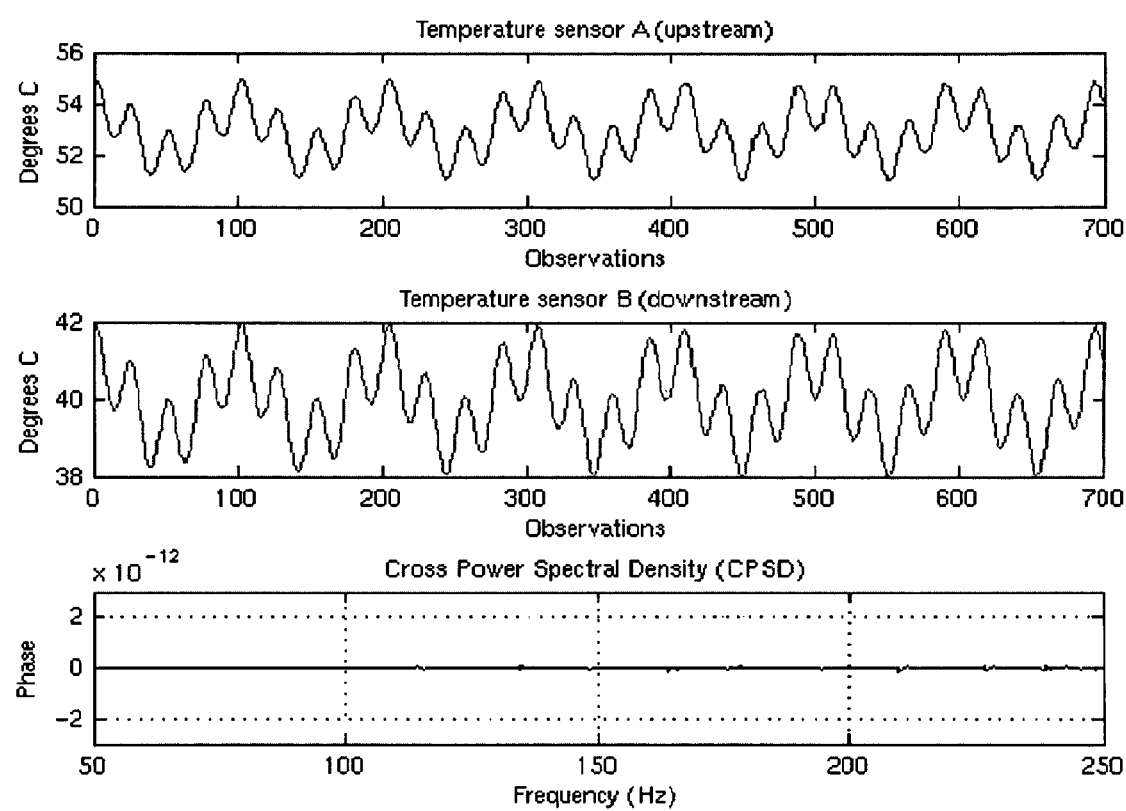
FIG. 3B illustrates two temperature sensor signals after synchronization and the corresponding CPSD plot of phase-vs-frequency having a zero slope in accordance with an embodiment of the present invention.

FIGS. 3A and 3B illustrate plots of two physical sensor signals (temperature) of a computer system and the corresponding CPSD plots of phase-vs-frequency for the signal pair in accordance with an embodiment of the present invention.

More specifically, FIG. 3A illustrates plots of two temperature sensor signals (sensor A and sensor B) and the corresponding CPSD plot of phase-versus-frequency having a non-zero slope in accordance with an embodiment of the present invention. As seen in FIG. 3A, the top two plots depict time-domain signals collected from temperature sensors A and B, respectively. Note that the two signals are not phase aligned and there is a time lag between the two signals. The bottom plot is a phase-versus-frequency graph from the CPSD analysis for the two signals represented in the top two plots. Note that the phase-versus-frequency graph has a positive slope as a result of the time lag between the two sensor signals.

Separately, FIG. 3B illustrates plots of the two temperature sensor signals after synchronization and the corresponding CPSD plot of phase-vs-frequency having a zero slope in accordance with an embodiment of the present invention. As seen in FIG. 3B, the top two plots depict time-domain signals collected from temperature sensors A and B, respectively, which are now phase aligned to each other. The bottom plot is a phase-versus-frequency graph from the CPSD analysis for the two signals represented in the top two plots. Note that the phase-verus-frequency graph now has a zero slope as a result of an optimal phase alignment between the two signals, which now have zero time lead or lag.

Conclusion

The present invention provides a frequency-domain technique for analytical re-sampling and phase alignment of telemetry signals gathered from a computer system. This technique facilitates performing power-versus-utilization monitoring with high efficiency and accuracy, even when the signals are dynamically varying.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for accurately synchronizing time-domain signals related to the operation of a computer system, comprising:
   receiving a first time-domain signal associated with a first system variable and a second time-domain signal associated with a second system variable from the computer system, wherein the first and second time-domain signals include signals associated with physical parameters gathered from physical sensors in the computer system;
   transforming the first and the second time-domain signals into a first frequency-domain signal and a second frequency-domain signal, respectively;
   computing a cross-power-spectral-density (CPSD) between the first and second frequency-domain signals to obtain a phase angle versus frequency graph between the two frequency-domain signals;
   extracting the slope of the phase angle versus frequency graph; and
   using the value of the slope to synchronize the first time-domain signal and the second time-domain signal.

2. The method of claim 1,
   wherein the value of the slope of the phase versus frequency graph is proportional to the phase difference between the first and the second time-domain signals; and
   wherein the sign of the slope determines a lead or lag relationship between the first and the second time-domain signals.

3. The method of claim 1,
   wherein the first time-domain signal is generated from a first sampled signal and the second time-domain signal is generated from a second sampled signal; and
   wherein a sampling rate of the first sampled signal is different from a sampling rate of the second sampled signal.

4. The method of claim 1, wherein prior to transforming the first and the second time-domain signals, the method further comprises re-sampling each of the time-domain signals so that a sampling rate of the first time-domain signal is substantially equal to a sampling rate of the second time-domain signal.

5. The method of claim 1, wherein the first time-domain signal is measured by a first measurement system having a first clock and the second time-domain signal is measured by a second measurement system having a second clock.

6. The method of claim 1, wherein using the value of the slope to synchronize the two time-domain signals involves iteratively adjusting a phase difference between the two time-domain signals until the slope of the phase angle versus frequency graph is substantially equal to zero.

7. The method of claim 1, wherein:
   the first system variable includes a physical sensor variable and a software performance variable; and
   the second system variable includes a physical sensor variable and a software performance variable.

8. The method of claim 7,
   wherein the physical sensor variable includes one of: a CPU power, and a CPU temperature; and
   wherein the software performance variable includes one of: a utilization metric of the CPU, and a throughput of the computer system.

9. The method of claim 1, wherein the first and the second time-domain signals are used to generate an accurate power-versus-utilization graph of the computer system.

10. A computer-readable storage medium storing instructions that when executed by a computer cause the computer to perform a method for accurately synchronizing time-domain signals related to the operation of a computer system, comprising:
    receiving a first time-domain signal associated with a first system variable and a second time-domain signal associated with a second system variable from the computer system, wherein the first and second time-domain signals include signals associated with physical parameters gathered from physical sensors in the computer system;
    transforming the first and the second time-domain signals into a first frequency-domain signal and a second frequency-domain signal, respectively;
    computing a cross-power-spectral-density (CPSD) between the first and second frequency-domain signals to obtain a phase angle versus frequency graph between the two frequency-domain signals;
    extracting the slope of the phase angle versus frequency graph; and
    using the value of the slope to synchronize the first time-domain signal and the second time-domain signal.

11. The computer-readable storage medium of claim 10,
    wherein the value of the slope of the phase versus frequency graph is proportional to the phase difference between the first and the second time-domain signals; and
    wherein the sign of the slope determines a lead or lag relationship between the first and the second time-domain signals.

12. The computer-readable storage medium of claim 10,
    wherein the first time-domain signal is generated from a first sampled signal and the second time-domain signal is generated from a second sampled signal; and
    wherein a sampling rate of the first sampled signal is different from a sampling rate of the second sampled signal.

13. The computer-readable storage medium of claim 10, wherein prior to transforming the first and the second time-domain signals, the method further comprises re-sampling each of the time-domain signals so that a sampling rate of the first time-domain signal is substantially equal to a sampling rate of the second time-domain signal.

14. The computer-readable storage medium of claim 10, wherein the first time-domain signal is measured by a first measurement system having a first clock and the second time-domain signal is measured by a second measurement system having a second clock.

15. The computer-readable storage medium of claim 10, wherein using the value of the slope to synchronize the two time-domain signals involves iteratively adjusting a phase difference between the two time-domain signals until the slope of the phase angle versus frequency graph is substantially equal to zero.

16. The computer-readable storage medium of claim 10, wherein:
the first system variable includes a physical sensor variable and a software performance variable; and
the second system variable includes a physical sensor variable and a software performance variable.

17. The computer-readable storage medium of claim 16, wherein the physical sensor variable includes one of: a CPU power, and a CPU temperature; and
wherein the software performance variable includes one of: a utilization metric of the CPU, and a throughput of the computer system.

18. The computer-readable storage medium of claim 10, wherein the first and the second time-domain signals are used to generate an accurate power-versus-utilization graph of the computer system.

19. An apparatus that accurately synchronizes time-domain signals related to the operation of a computer system, comprising:

a receiving mechanism configured to receive a first time-domain signal associated with a first system variable and a second time-domain signal associated with a second system variable from the computer system, wherein the first and second time-domain signals include signals associated with physical parameters gathered from physical sensors in the computer system;

a transformation mechanism configured to transform the first and the second time-domain signals into a first frequency-domain signal and a second frequency-domain signal, respectively;

a computing mechanism configured to compute a cross-power-spectral-density (CPSD) between the first and second frequency-domain signals to obtain a phase angle versus frequency graph between the two frequency-domain signals;

an extraction mechanism configured to extract the slope of the phase angle versus frequency graph; and a synchronization mechanism configured to use the value of the slope to synchronize the first time-domain signal and the second time-domain signal.

20. The apparatus of claim 19,
wherein the value of the slope of the phase versus frequency graph is proportional to the phase difference between the first and the second time-domain signals; and
wherein the sign of the slope determines a lead or lag relationship between the first and the second time-domain signals.

* * * * *